United States Patent
Ozawa (10) Patent No.: US 7,391,716 B2
(45) Date of Patent: Jun. 24, 2008

(54) SEMICONDUCTOR INTEGRATED CIRCUIT AND DATA TRANSMISSION SYSTEM

(75) Inventor: Seiichi Ozawa, Tokyo (JP)

(73) Assignee: Thine Electronics, Inc., Tokyo (JP)

(*) Notice: Subject to any disclaimer, the term of this patent is extended or adjusted under 35 U.S.C. 154(b) by 932 days.

(21) Appl. No.: 10/477,713

(22) PCT Filed: May 28, 2002

(86) PCT No.: PCT/JP02/05160

§ 371 (c)(1),
(2), (4) Date: Nov. 14, 2003

(87) PCT Pub. No.: WO02/100058

PCT Pub. Date: Dec. 12, 2002

(65) Prior Publication Data

US 2004/0136402 A1     Jul. 15, 2004

(30) Foreign Application Priority Data

May 30, 2001 (JP) .............................. 2001-162110

(51) Int. Cl.
    *H04J 7/00* (2006.01)
(52) U.S. Cl. .................. 370/212; 375/238; 327/175
(58) Field of Classification Search ................ 370/203, 370/210, 360, 503, 504, 507, 522, 212, 213, 370/516; 375/219, 221, 238, 271, 258, 293, 375/294, 239, 222, 257; 327/50, 53, 174, 327/175; 341/31, 35
See application file for complete search history.

(56) References Cited

U.S. PATENT DOCUMENTS 6,038,255 A * 3/2000 Palmer et al. ................ 375/238
6,084,453 A * 7/2000 Fuse et al. ................... 327/176
6,295,272 B1 * 9/2001 Feldman et al. ............. 370/210
6,430,220 B1 * 8/2002 Determan .................... 375/238
6,693,917 B1 * 2/2004 Feldman et al. ............. 370/488
6,788,743 B1 * 9/2004 Pfeil .......................... 375/271

FOREIGN PATENT DOCUMENTS

| JP | 54-12611 A | 1/1979 |
| JP | 60-5654 A | 1/1985 |
| JP | 63-120428 U | 8/1988 |
| JP | 2000-78027 A | 3/2000 |
| WO | WO 00-16525 A1 | 3/2000 |

* cited by examiner

Primary Examiner—Doris H. To
Assistant Examiner—Habte Mered
(74) Attorney, Agent, or Firm—Sughrue Mion, PLLC (57) ABSTRACT

A semiconductor integrated circuit which transmits voice data as ancillary data while maintaining transmission quality without increasing the number of transmission cables in a system for carrying out serial transmission of image data as main data. The semiconductor integrated circuit includes a main data transmitting circuit for converting main data into serial data and transmitting the serial data via at least one transmission path in synchronization with a clock signal, and an ancillary data transmitting circuit for pulse-width-modulating the clock signal by using ancillary data to generate a modulated clock signal having at least three kinds of pulse widths in a predetermined order and transmitting the modulated clock signal via another transmission path.

11 Claims, 10 Drawing Sheets

SEMICONDUCTOR INTEGRATED CIRCUIT AND DATA TRANSMISSION SYSTEM

TECHNICAL FIELD

The present invention generally relates to a semiconductor integrated circuit, and particularly to a semiconductor integrated circuit to be used for carrying out serial transmission of image data as main data while transmitting voice data as ancillary data. Furthermore, the present invention relates to a data transmission system that uses such a semiconductor integrated circuit.

BACKGROUND ART

In systems for carrying out serial transmission of image data as main data, in order to transmit voice data as ancillary data, a format is required which has high compatibility with conventional formats without increasing the number of transmission cables.

The international publication of international patent application, WO 00/16525, discloses a method of transmitting ancillary data in correspondence with the pulse width of a clock signal, which is used for transmitting main data, by pulse-width-modulating the clock signal. This method allows the ancillary data to be transmitted without increasing the number of transmission cables.

Figure 1:
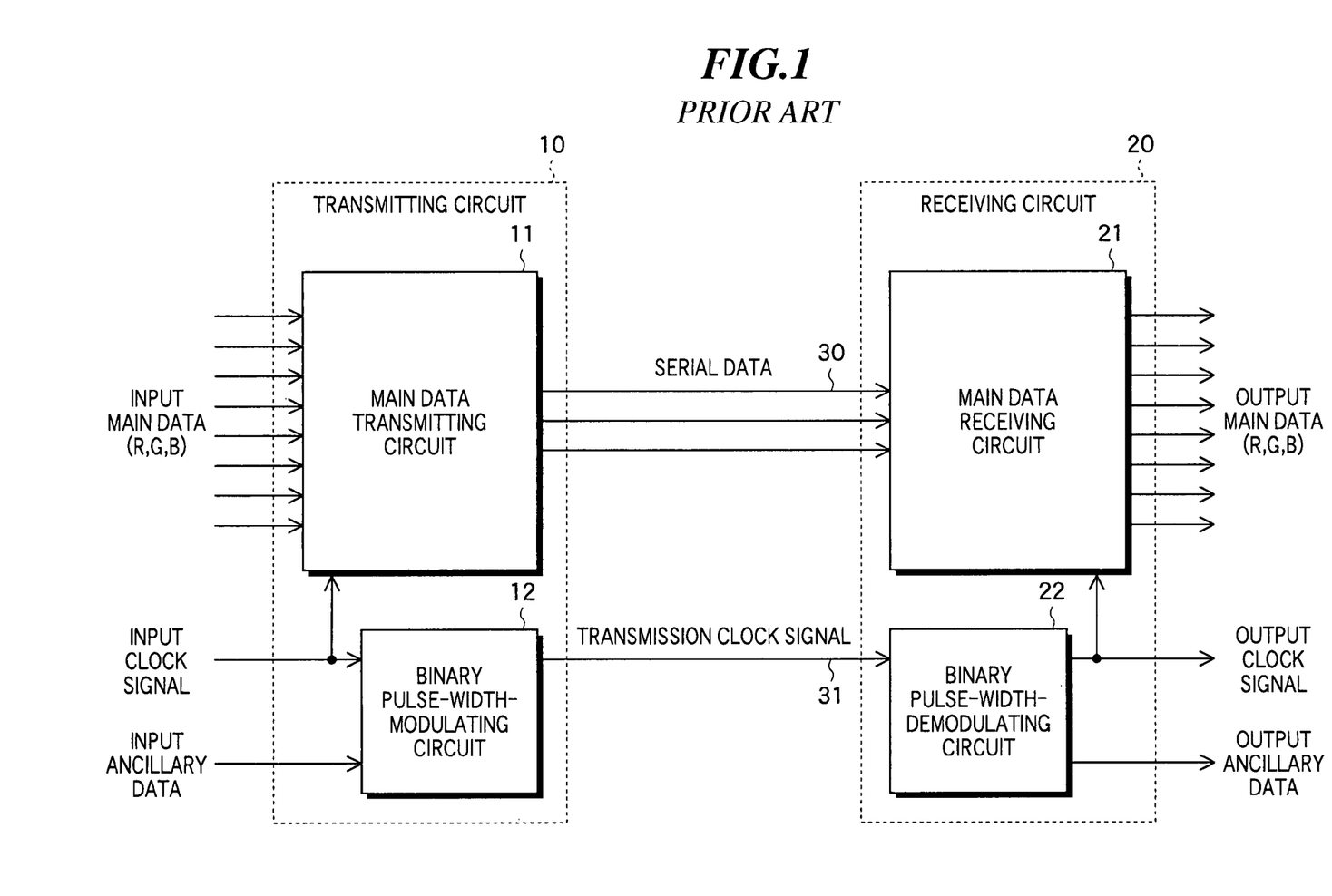
FIG. 1 is a block diagram showing a configuration of a conventional data transmission system.

FIG. 1 shows a configuration of a conventional data transmission system using such a method. As shown in FIG. 1, this data transmission system includes a transmitting circuit 10 which inputs main and ancillary data and a clock signal to transmit serial data and a transmission clock signal, a receiving circuit 20 which receives the transmitted serial data and transmission clock signal to output the main and ancillary data and clock signal, data transmission cables 30 which are used for transmitting the serial data, and a clock signal transmission cable 31 which is used for transmitting the transmission clock signal.

The transmitting circuit 10 is constructed of a main data transmitting circuit 11 and a binary pulse-width-modulating circuit 12. For example, the transmitting circuit 10 is supplied with RGB three lines of 8-bit image data, i.e., 24-bit (=3×8-bit) image data as the input main data, the input clock signal, and one-bit voice data as the input ancillary data. In the main data transmitting circuit 11, the input main data are converted into the serial data by using the input clock signal, and are transmitted as three channels of serial data. Furthermore, in the binary pulse-width-modulating circuit 12, the input clock signal is binary pulse-width-modulated by using the input ancillary data, and then transmitted as the transmission clock signal.

The receiving circuit 20 is constructed of a main data receiving circuit 21 and a binary pulse-width-demodulating circuit 22. In the binary pulse-width-demodulating circuit 22, the transmission clock signal is demodulated to obtain output ancillary data and an output clock signal. In the main data receiving circuit 21, the three channels of serial data are converted into parallel data by using the output clock signal so as to obtain output main data.

Figure 2:
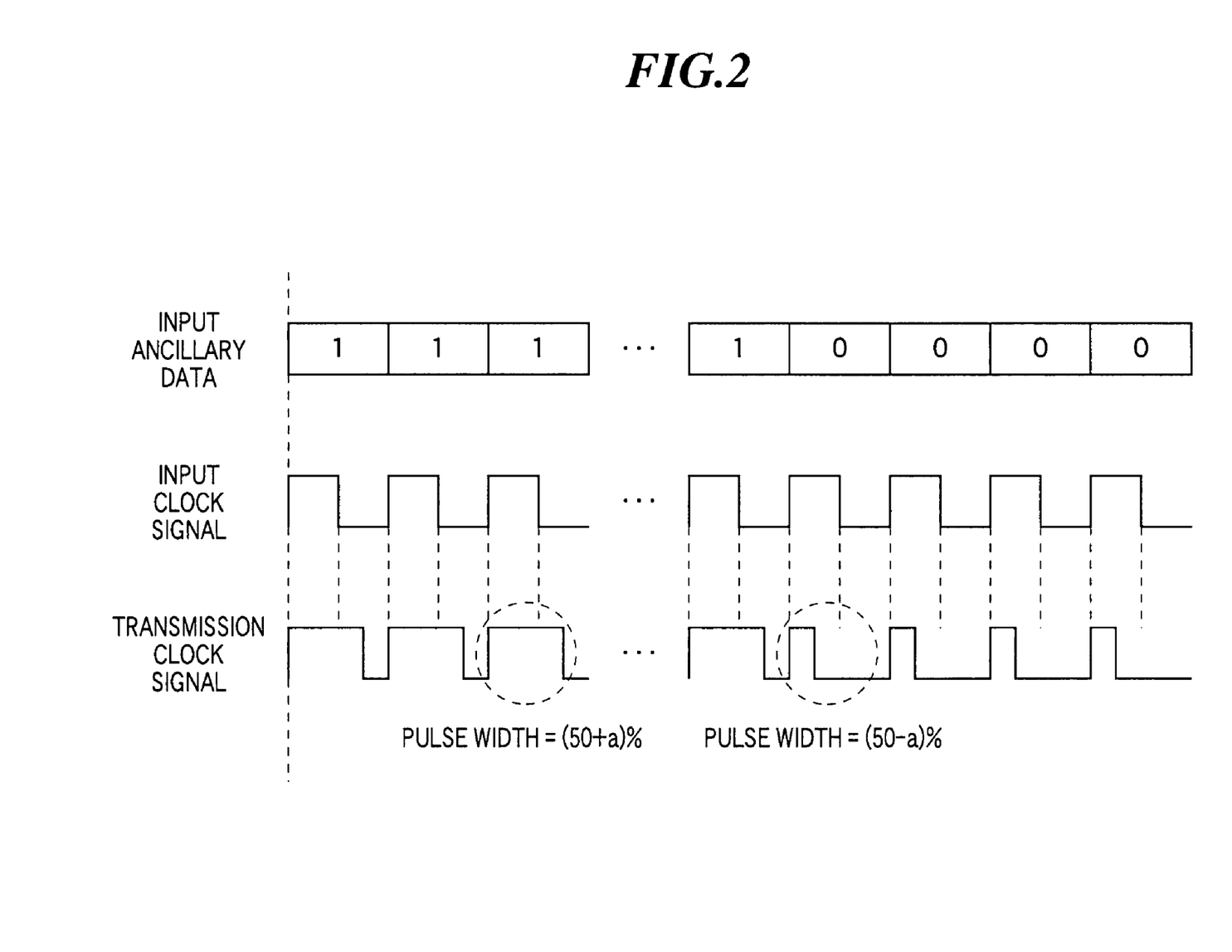
FIG. 2 is a timing chart showing the operation of a binary pulse-width-modulating circuit shown in FIG. 1.

FIG. 2 shows the operation of the binary pulse-width-modulating circuit as shown in FIG. 1. The transmission clock signal is generated by setting the pulse width of the input clock signal to be at (50+a) % when the input ancillary data is "1", and by setting the pulse width of the input clock signal to be at (50−a) % when the input ancillary data is "0".

However, as shown in FIG. 2, when values of the input ancillary data are biased toward "1" or "0", the average pulse width of the clock signal will deviate from 50%, resulting in biasing DC balance of the clock signal. This causes a problem of increasing jitter of the clock signal and deteriorating transmission quality of the whole system. Particularly when optical transmission is used, DC component cannot be transmitted, and therefore, the biased DC balance has a great influence.

DISCLOSURE OF THE INVENTION

Therefore, in view of the above-mentioned problems, an object of the present invention is to transmit voice data as ancillary data while maintaining transmission quality without increasing the number of transmission cables in a system for carrying out serial transmission of image data as main data.

In order to solve the above-described problems, a semiconductor integrated circuit according to a first aspect of the present invention comprises: a main data transmitting circuit for converting main data into serial data and transmitting the serial data via at least one transmission path in synchronization with a clock signal; and an ancillary data transmitting circuit for pulse-width-modulating the clock signal by using ancillary data to generate a modulated clock signal having at least three kinds of pulse widths in a predetermined order and transmitting the modulated clock signal via another transmission path.

Further, a semiconductor integrated circuit according to a second aspect of the present invention comprises: a main data receiving circuit for receiving serial data via at least one transmission path and converting the received serial data into parallel data to obtain main data; and an ancillary data receiving circuit for receiving a pulse-width-modulated clock signal via another transmission path and demodulating the received clock signal to obtain ancillary data by detecting whether a pulse width of the received clock signal is within a predetermined range.

Furthermore, a data transmission system according to one aspect of the present invention comprises: a transmitting circuit for converting main data into serial data and transmitting the serial data via at least one transmission path in synchronization with a clock signal, while pulse-width-modulating the clock signal by using ancillary data to generate a modulated clock signal having at least three kinds of pulse widths in a predetermined order and transmitting the modulated clock signal via another transmission path; and a receiving circuit for receiving the serial data via the at least one transmission path and converting the received serial data to parallel data to obtain the main data, while receiving the pulse-width-modulated clock signal via the other transmission path and demodulating the received clock signal to obtain the ancillary data by detecting whether the pulse width of the received clock signal is within a predetermined range.

According to the present invention, the ancillary data can be transmitted without increasing the number of transmission cables by selecting at least three kinds of pulse widths depending on the value of the ancillary data so as to pulse-width-modulate the clock signal. Furthermore, the DC balance of the modulated clock signal can be maintained by equalizing the expected value of the pulse width for each value of the ancillary data, and therefore, the transmission quality of the system can be maintained.

BRIEF DESCRIPTION OF THE DRAWINGS

Advantages and features of the present invention will be clarified from a consideration of the following detailed description, taken in conjunction with the drawings. In these drawings, the same reference numerals refer to the same components.

BEST MODE FOR CARRYING OUT THE INVENTION

Figure 3:
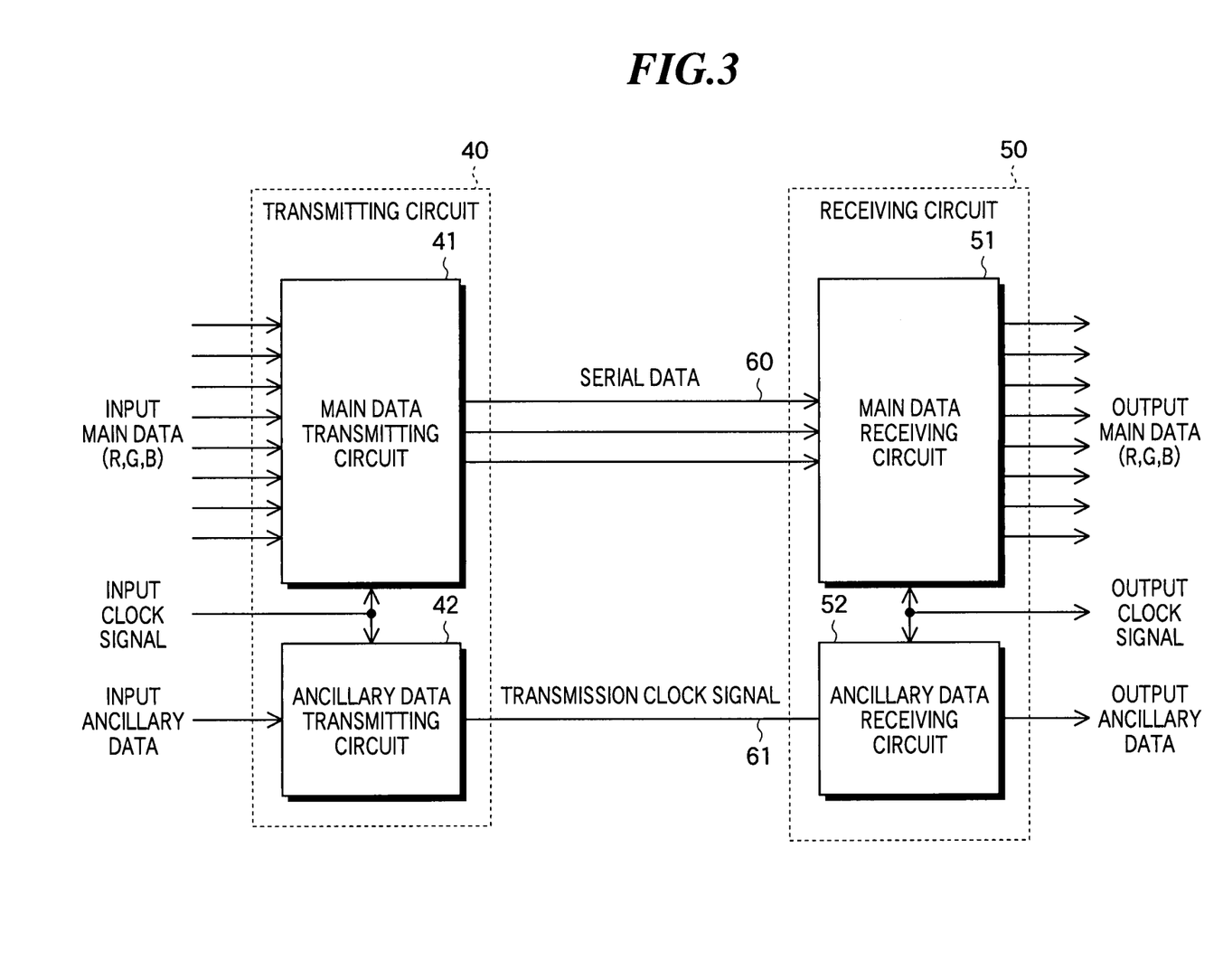
FIG. 3 is a block diagram showing a configuration of a semiconductor integrated circuit according to a first embodiment of the present invention.

FIG. 3 shows a configuration of a data transmission system according to a first embodiment of the present invention. As shown in FIG. 3, this data transmission system includes a transmitting circuit 40 to which main and ancillary data and a clock signal are inputted and which transmits serial data and a transmission clock signal, a receiving circuit 50 which receives the transmitted serial data and transmission clock signal and outputs the main and ancillary data and a clock signal, data transmission cables 60 which are used for transmitting the serial data, and a clock signal transmission cable 61 which is used for transmitting the transmission clock signal.

The transmitting circuit 40 is constructed of a semiconductor integrated circuit including a main data transmitting circuit 41 and an ancillary data transmitting circuit 42. For example, the transmitting circuit 40 is supplied with three RGB channels of 8-bit image data, i.e., 24-bit (=3×8-bit) image data as the input main data, the input clock signal, and one-bit voice data as the input ancillary data. In the main data transmitting circuit 41, the input main data are converted into the serial data by using the input clock signal, and are transmitted as three channels of serial data. Furthermore, in the ancillary data transmitting circuit 42, the input clock signal is ternary pulse-width-modulated by using the input ancillary data, and then transmitted as the transmission clock signal.

The receiving circuit 50 is constructed of a semiconductor integrated circuit including a main data receiving circuit 51 and an ancillary data receiving circuit 52. In the ancillary data receiving circuit 52, the transmission clock signal is demodulated and output ancillary data and an output clock signal are obtained. The three channels of serial data are converted into parallel data in the main data receiving circuit 51 by using the output clock signal so that output main data is obtained.

Herein, in the main data transmitting circuit 41, the serial data are transmitted in synchronization with the rise timing of the input clock signal, and in the ancillary data transmitting circuit 42, pulse-width-modulation is performed by changing only the fall timing of the input clock signal. In this data transmission system, noise tolerance can be increased by employing differential signals as a part or all of the three channels of serial data and the transmission clock signal, and thereby the transmission quality can be further improved. In this case, a part or all of the outputs of the transmitting circuit 40 are provided as differential outputs, and a part or all of the inputs of the receiving circuit 50 are provided as differential inputs.

Figure 4:
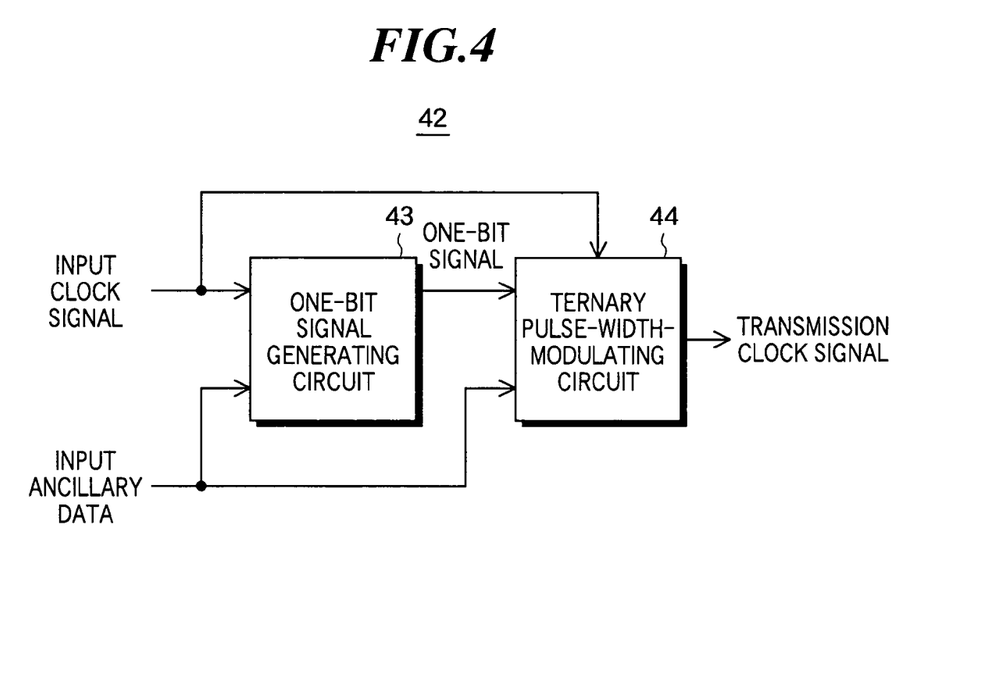
FIG. 4 is a block diagram showing a configuration of an ancillary data transmitting circuit shown in FIG. 3.

FIG. 4 shows a configuration of the ancillary data transmitting circuit shown in FIG. 3. As shown in FIG. 4, the ancillary data transmitting circuit 42 is constructed of a one-bit signal generating circuit 43 which outputs a one-bit signal (bit stream) based on the input clock signal and the input ancillary data, and a ternary pulse-width-modulating circuit 44 which outputs the transmission clock signal based on the input clock signal, the input ancillary data and the one-bit signal.

In synchronization with the input clock signal, the one-bit signal generating circuit 43 inverts the value of the one-bit signal and outputs the inverted value when the input ancillary data is "1", whereas it continues to output the same value when the input ancillary data is "0".

Moreover, the ternary pulse-width-modulating circuit 44 outputs the transmission clock signal by modulating the pulse width of the input clock signal to a ternary value of (50−a) %, 50%, (50+a) % of a cycle of the input clock signal based on the input clock signal, the input ancillary data and the one-bit signal. Herein, $0<a<50$, and preferably $10 \leqq a \leqq 30$, and more preferably $a \approx 20$.

Figure 5:
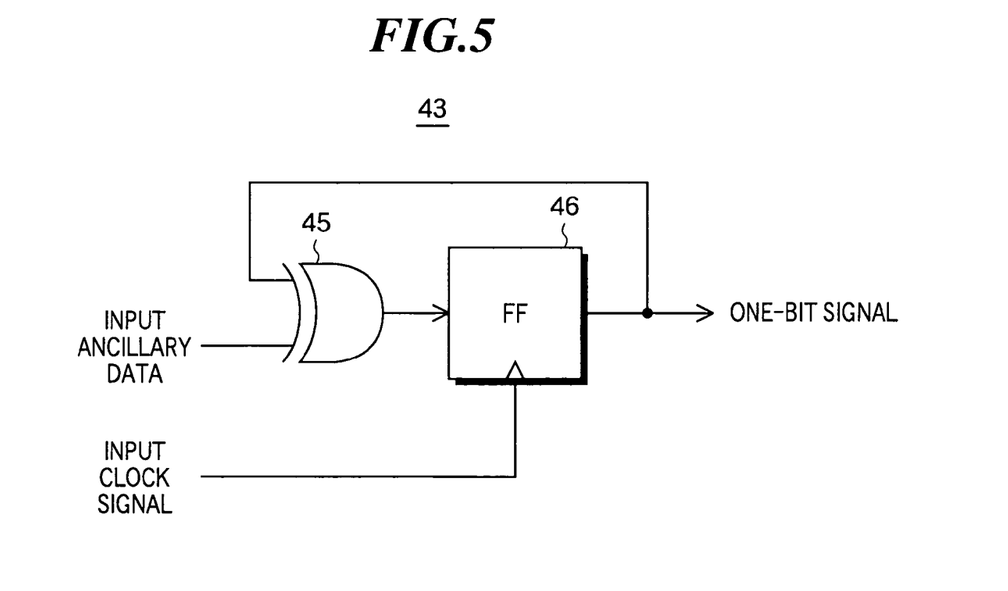
FIG. 5 is a block diagram showing a configuration of a one-bit signal generating circuit shown in FIG. 4.

FIG. 5 shows a configuration of the one-bit signal generating circuit shown in FIG. 4. As shown in FIG. 5, the one-bit signal generating circuit 43 is constructed of an XOR (exclusive OR) circuit 45 which generates an output signal by inverting the value of the one-bit signal when the value of the input ancillary data is "1", and a flip-flop circuit 46 which latches an output signal of the XOR circuit 45 in synchronization with the input clock signal. By supplying the output signal of the flip-flop circuit 46 as a feedback signal to the XOR circuit 45, the value of the one-bit signal is inverted in synchronization with the input clock signal when the value of the input ancillary data is "1".

Figure 6:
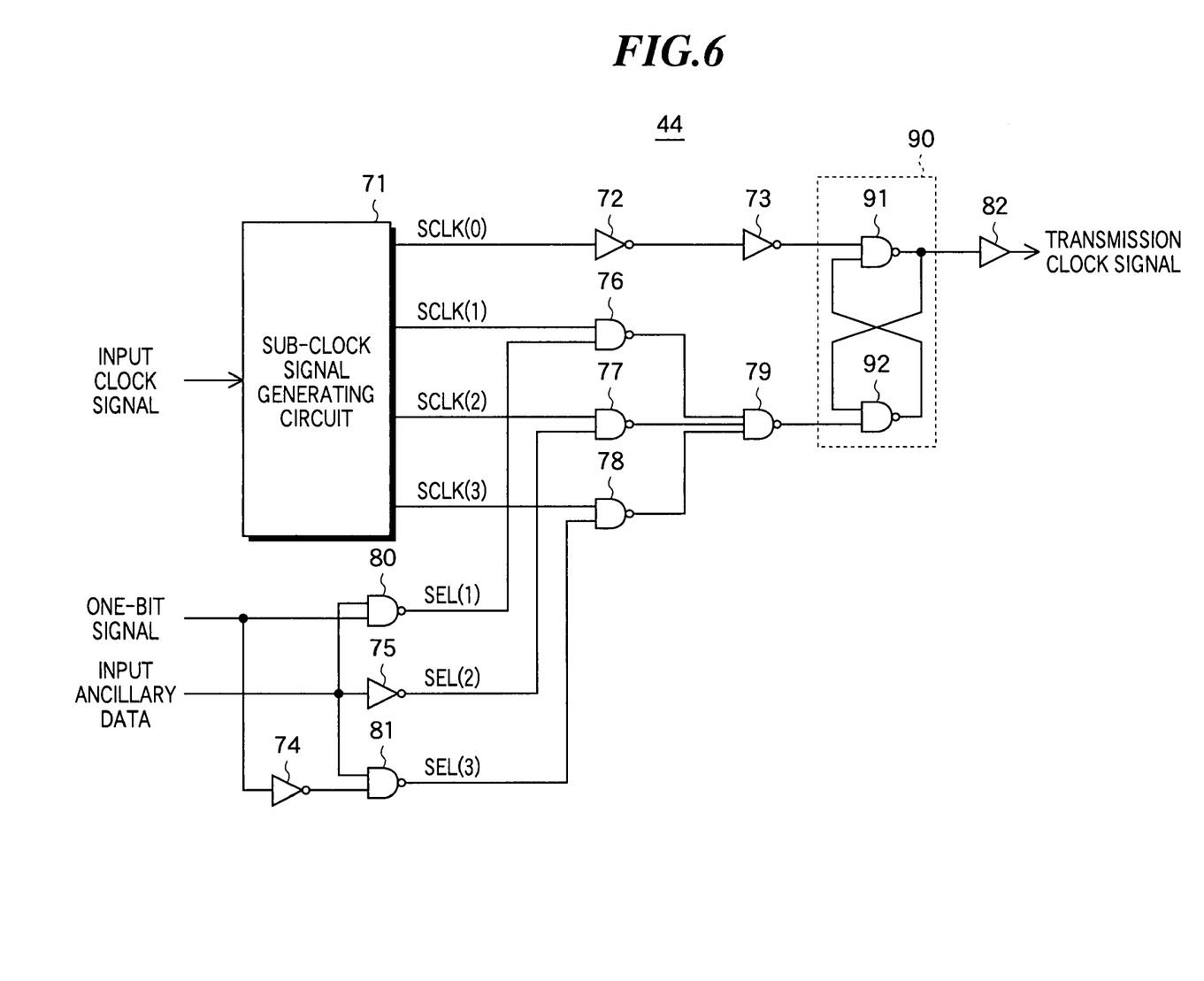
FIG. 6 is a block diagram showing a configuration of a ternary pulse-width-modulating circuit shown in FIG. 4.

FIG. 6 shows a configuration of the ternary pulse-width-modulating circuit shown in FIG. 4. As shown in FIG. 6, the ternary pulse-width-modulating circuit 44 is constructed of a sub-clock signal generating circuit 71 which generates a plurality of sub-clock signals based on the input clock signal, inverters 72-75, NAND circuits 76-81, a buffer circuit 82, and an RS latch circuit 90. The RS latch circuit 90 is constructed of NAND circuits 91 and 92.

Figure 7:
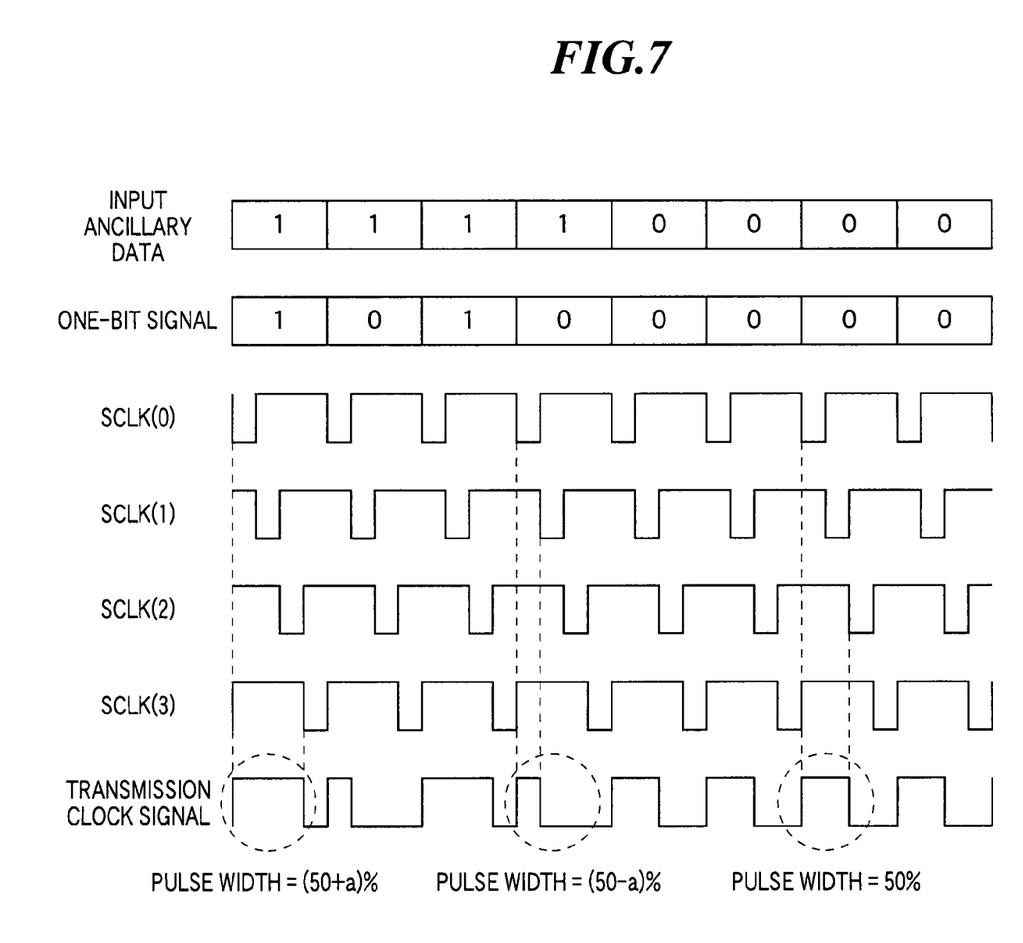
FIG. 7 is a timing chart showing the operation of the ternary pulse-width-modulating circuit shown in FIG. 6.

FIG. 7 shows the operation of the ternary pulse-width-modulating circuit shown in FIG. 6. Based on the input clock signal, the sub-clock signal generating circuit 71 generates a sub-clock signal SCLK(0), a sub-clock signal SCLK(1) having a phase behind the sub-clock signal SCLK(0) by (50−a) %, a sub-clock signal SCLK(2) having a phase behind the sub-clock signal SCLK(0) by 50%, and a sub-clock signal SCLK(3) having a phase behind the sub-clock signal SCLK(0) by (50+a) %. Note that, as to the sub-clock signals SCLK(0) to SCLK(3), the pulse width of the low level is set to be shorter than (50−a) % of one cycle.

With reference to FIG. 6 again, the NAND circuit 80 outputs a select signal SEL(1) based on the one-bit signal and the input ancillary data, the inverter 75 outputs a select signal SEL(2) by inverting the input ancillary data, and the NAND circuit 81 outputs a select signal SEL(3) based on the one-bit signal inverted by the inverter 74 and the input ancillary data.

Furthermore, the sub-clock signal SCLK(0) is delayed by two inverters 72 and 73, and inputted to the set terminal of the RS latch circuit 90. The sub-clock signal SCLK (1) and select signal SEL(1) are inputted to the NAND circuit 76, the sub-clock signal SCLK(2) and select signal SEL(2) are inputted to the NAND circuit 77, and the sub-clock signal SCLK(3) and select signal SEL(3) are inputted to the NAND circuit 78. The output signals of these NAND circuits 76-78 are inputted to the NAND circuit 79, and the output signal of the NAND circuit 79 is inputted to the reset terminal of the RS latch circuit 90.

The output signal of the RS latch circuit 90 is buffered by the buffer circuit 82 and outputted as the transmission clock signal. According to this configuration, the pulse width of the input clock signal can be modulated to (50−a) %, 50%, (50+a) % of the cycle of the input clock signal based on the input ancillary data and the one-bit signal.

As shown in FIG. 7, when the input ancillary data is "1", the one-bit signal is inverted sequentially. The RS latch circuit 90 is set by the sub-clock signal SCLK (0) going to the low level, and thereby the transmission clock signal rises. The timing at which the RS latch circuit 90 is reset is selected by the input ancillary data and the one-bit signal. When the input ancillary data is "0", the sub-clock signal SCLK(2) is selected and the resulting pulse width of the transmission clock signal becomes 50%. When the input ancillary data is "1" and the one-bit signal is "0", the sub-clock signal SCLK(1) is selected and the resulting pulse width of the transmission clock signal becomes (50−a) %. When the input ancillary data is "1" and the one-bit signal is also "1", the sub-clock signal SCLK (3) is selected and the resulting pulse width of the transmission clock signal becomes (50+a) %. That is, the pulse width of the transmission clock signal becomes 50% when the input ancillary data is "0", while it becomes alternately (50−a) % and (50+a) % when the input ancillary data is "1".

According to the above operation, since the input ancillary data can be transmitted at the same transmission rate as the input clock signal, the transmission efficiency of the ancillary data can be made 100%. Moreover, if the probability of the input ancillary data being "0" is denoted as P0, and the probability of the input ancillary data being "1" is denoted as P1, then the average duty $D_{AVE}$ of the transmission clock signal will be 50% as shown in the following equation:

$$D_{AVE}(\%) = P0 \times 50 + P1 \times (50 - a + 50 + a)/2$$
$$= (P0 + P1) \times 50 = 50$$

Therefore, the DC balance of the transmission clock signal can be maintained.

Figure 8:
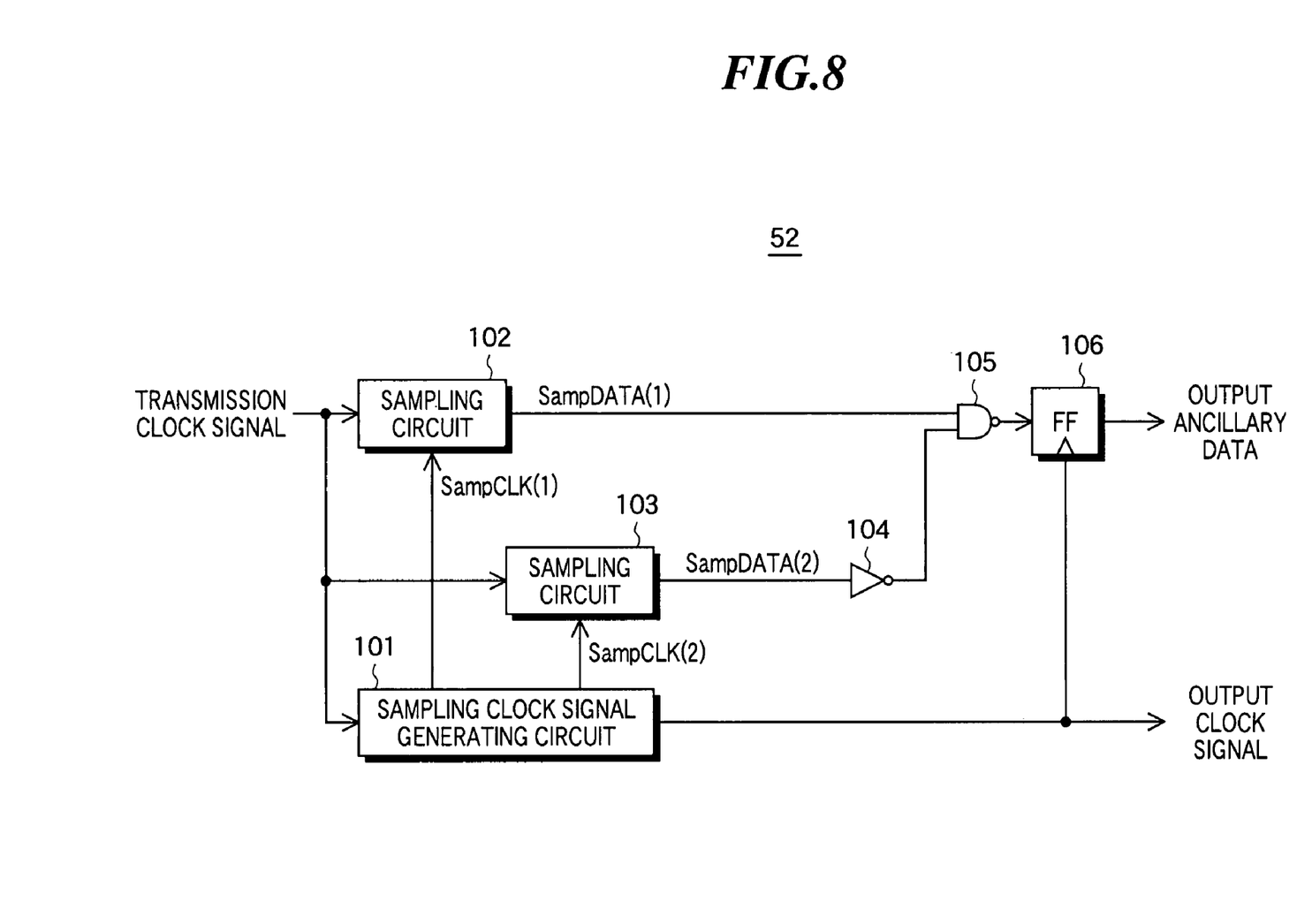
FIG. 8 is a block diagram showing a configuration of an ancillary data receiving circuit shown in FIG. 3.

FIG. 8 shows a configuration of the ancillary data receiving circuit shown in FIG. 3. As shown in FIG. 8, the ancillary data receiving circuit 52 includes a sampling clock signal generating circuit 101 which generates sampling clock signals SampCLK(1) and SampCLK(2) and the output clock signal by using the rising edge of the transmission clock signal as a reference, a sampling circuit 102 which samples the transmission clock signal in synchronization with the sampling clock signal SampCLK(1) to output sampled data SampDATA(1), and a sampling circuit 103 which samples the transmission clock signal in synchronization with the sampling clock signal SampCLK(2) to output sampled data SampDATA(2). Furthermore, the ancillary data receiving circuit 52 includes an inverter 104 which inverts the sampled data SampDATA(2), a NAND circuit 105 to which the sampled data SampDATA(1) and the inverted sampled data SampDATA(2) are inputted, and a flip-flop circuit 106 which latches the output data of the NAND circuit 105 in synchronization with the output clock signal for output as the output ancillary data.

The sampling clock signal SampCLK(1) rises at the timing behind the rising edge of the transmission clock signal by (50−b) % of the cycle of the transmission clock signal. Moreover, the sampling clock signal SampCLK(2) rises at the timing behind the rising edge of the transmission clock signal by (50+b) % of the cycle of the transmission clock signal.

Accordingly, by determining whether or not the pulse width of the transmission clock signal is within the range from (50−b) % to (50+b) % of one cycle, it is possible to demodulate the transmission clock signal which has been pulse-width-modulated so as to obtain the ancillary data. Herein, by configuring the sampling clock signal generating circuit with a DLL (delay locked loop) or PLL (phase locked loop), a sampling clock signal with a small jitter can be generated and thus a more precise determination can be made.

Figure 9:
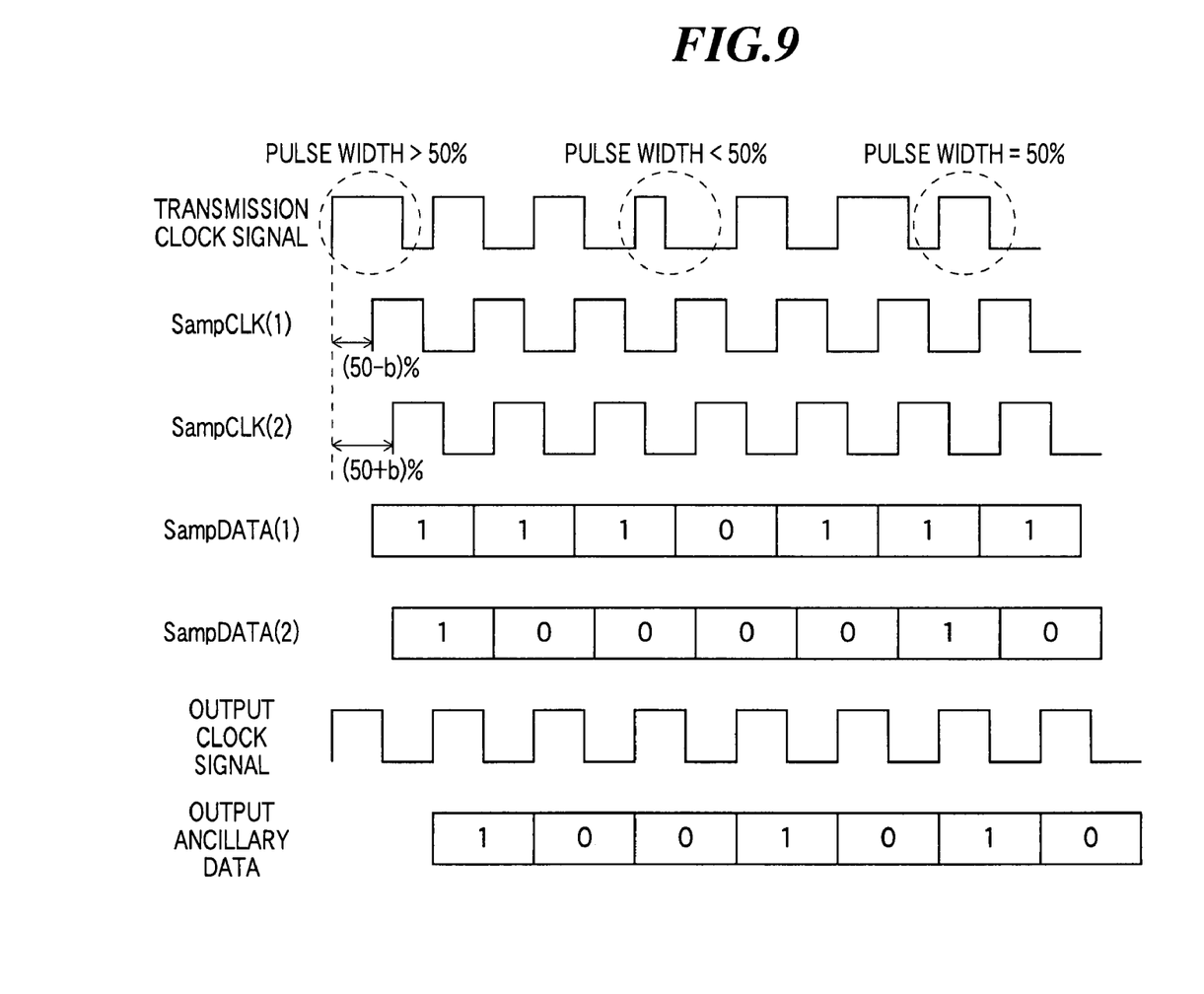
FIG. 9 is a timing chart showing the operation of the ancillary data receiving circuit shown in FIG. 8.

FIG. 9 shows the operation of the ancillary data receiving circuit shown in FIG. 8. As shown in FIG. 9, when the pulse width of the transmission clock signal is 50% of one cycle, the sampled data SampDATA(1) becomes "1" and the sampled data SampDATA(2) becomes "0", and accordingly the output ancillary data becomes "0". On the other hand, when the pulse width of the transmission clock signal is (50+a) % of one cycle, both the sampled data SampDATA(1) and SampDATA (2) become "1", and accordingly the output ancillary data becomes "1". Furthermore, when the pulse width of the transmission clock signal is (50−a) % of one cycle, both the sampled data SampDATA(1) and SampDATA(2) become "0", and accordingly the output ancillary data becomes "1". Thus, the transmission clock signal which has been pulse-width-modulated can be demodulated.

Next, the second embodiment of the present invention will be described.

Figure 10:
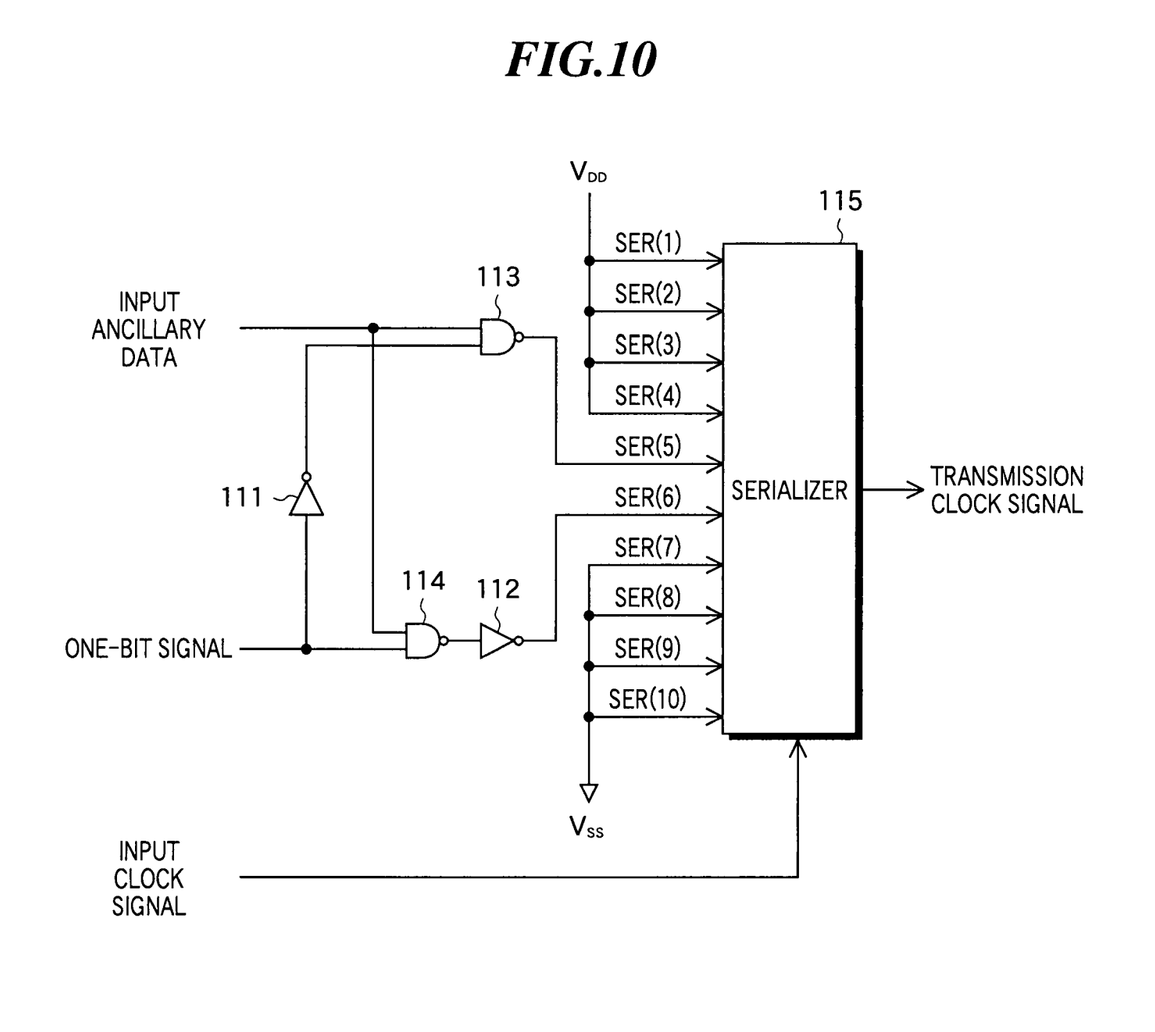
FIG. 10 is a block diagram showing a configuration of a ternary pulse-width-modulating circuit in a data transmission system according to a second embodiment of the present invention.

FIG. 10 shows a configuration of a ternary pulse-width-modulating circuit in a data transmission system according to the second embodiment of the present invention. The rest of the configuration is the same as the first embodiment.

As shown in FIG. 10, the ternary pulse-width-modulating circuit in the present embodiment is constructed of inverters 111 and 112, NAND circuits 113 and 114, and a 10-to-1 serializer 115, and modulates the pulse width of the input clock signal to 40%, 50% or 60%. The serializer 115 serializes ten data which are simultaneously inputted in synchronization with the input clock signal and outputs them at a plurality of timings.

The first input signal SER(1) to the fourth input signal SER(4) of the serializer 115 are set at a power-supply voltage $V_{DD}$, and "1" is outputted from the serializer 115 at the timings corresponding to these input signals. The seventh input signal SER(7) to the tenth input signal SER(10) of the serializer 115 are set at a power-supply voltage $V_{SS}$ (ground voltage in the present embodiment), and "0" is outputted from the serializer 115 at the timings corresponding to these input signals. The input ancillary data, and the one-bit signal inverted by the inverter 111, are inputted to the NAND circuit 113, and the output data of the NAND circuit 113 serves as the fifth input signal SER(5) of the serializer 115. Moreover, the input ancillary data and the one-bit signal are inputted to the NAND circuit 114, and the output data of the NAND circuit 114 is inverted by the inverter 112 to serve as the sixth input signal SER(6) of the serializer 115. The serializer 115 serializes these input signals, and outputs the serialized signals as the transmission clock signal.

Figure 11:
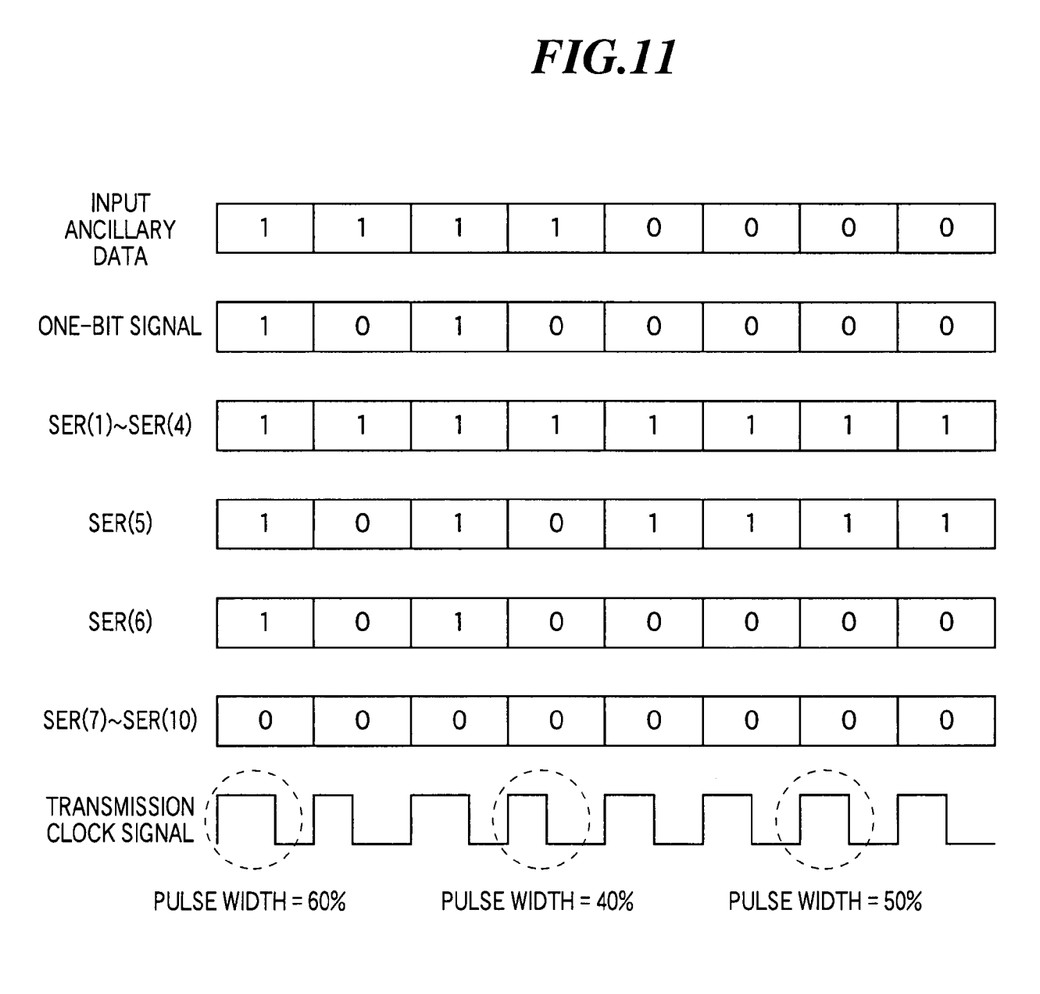
FIG. 11 is a timing chart showing the operation of the ternary pulse-width-modulating circuit shown in FIG. 10.

FIG. 11 shows the operation of the ternary pulse-width-modulating circuit shown in FIG. 10. As shown in FIG. 11, when the input ancillary data is "1" and the one-bit signal is also "1", both the fifth input signal SER(5) and the sixth input signal SER(6) of the serializer become "1", and accordingly the transmission clock signal having the pulse width of 60% is outputted. Moreover, when the input ancillary data is "1" and the one-bit signal is "0", both the fifth input signal SER(5) and the sixth input signal SER(6) of the serializer become "0", and accordingly the transmission clock signal having the pulse width of 40% is outputted. On the other hand, when the input ancillary data is "0", the first input signal SER(1) to the fifth input signal SER(5) of the serializer 115 become "1" and the sixth input signal SER(6) to the tenth input signal SER(10) of the serializer 115 become "0", and accordingly the transmission clock signal having the pulse width of 50% is outputted.

According to the above-mentioned operation, because the input ancillary data can be transmitted at the same transmission rate as the input clock signal, the transmission efficiency of the ancillary data can be made 100%. Moreover, because the average pulse width of the transmission clock signal becomes 50% of one cycle, the DC balance of the transmission clock signal can be maintained.

Although the present invention has been described on the basis of the embodiments, the present invention is not limited to the above-described embodiments, and various changes and modifications may be freely made within the scope described in the claims.

Industrial Applicability

The present invention is applicable to image devices, computers and the like which transmit image data and voice data.

The invention claimed is:

1. A data transmitting and receiving apparatus comprising:
a main data transmitting circuit for converting main data into serial data and transmitting the serial data via at least one transmission path in synchronization with a clock signal;
a main data receiving circuit for receiving the serial data and converting the received serial data into parallel data to obtain main data;
an ancillary data transmitting circuit for pulse-width-modulating the clock signal by using ancillary data to generate a modulated clock signal having at least three kinds of pulse widths in a predetermined order and transmitting the modulated clock signal via another transmission path, said ancillary data transmitting circuit including a one-bit signal generating circuit for generating a one-bit signal which is inverted at a cycle of the clock signal when the second value is inputted as the ancillary data and a pulse width generating and modulating circuit for generating a pulse having a pulse width of 50% of the cycle of the clock signal when the first value is inputted as the ancillary data and alternately and selectively generating (i) a pulse having a pulse width of (50−a)% of the cycle of the clock signal when the second value is inputted as the ancillary data and the first value is inputted as the one-bit signal and (ii) a pulse having a pulse width of (50+a)% of the cycle of the clock signal when the second value is inputted as the ancillary data and the second value is inputted as the one-bit signal, where "a" satisfies 0<a<50; and
an ancillary data receiving circuit for receiving the pulse-width-modulated clock signal and demodulating the received clock signal to obtain ancillary data, said ancillary data receiving circuit including a pulse width detecting circuit for receiving the pulse-width-modulated clock signal and detecting whether or not the pulse width of the received clock signal is within a range from (50−b)% to (50+b)% of one cycle on the basis of a rising edge of the received clock signal, where "b" satisfies 0<b<50.

2. The data transmitting and receiving apparatus according to claim 1, wherein "a" satisfies 10≦a≦30, while "b" satisfies 10≦b≦30.

3. The data transmitting and receiving apparatus according to claim 1, wherein said one-bit signal generating circuit includes:
an XOR (exclusive OR) circuit to which the ancillary data and the one-bit signal which has been fed back are inputted; and
a flip-flop circuit for latching an output signal of said XOR circuit in synchronization with the clock signal and outputting it as the one-bit signal.

4. The data transmitting and receiving apparatus according to claim 1, wherein said ancillary data receiving circuit includes:
a sampling clock signal generating circuit for generating a first sampling clock signal and a second sampling clock signal on the basis of the received clock signal;
a first sampling circuit for sampling the received clock signal in synchronization with the first sampling clock signal;
a second sampling circuit for sampling the receive clock signal in synchronization with the second sampling clock signal; and
a logic circuit for obtaining the ancillary data on the basis of output signals of said first and second sampling circuits.

5. The data transmitting and receiving apparatus according to claim 4, wherein said sampling clock signal generating circuit includes one of a delay lock loop circuit and a phase lock loop circuit.

6. The data transmitting and receiving apparatus according to claim 1, wherein said pulse width detecting circuit includes:
an inverter for inverting sampled data of said second sampling circuit;
a NAND circuit to which sampled data of said first sampling circuit and the sampled data inverted by said inverter are inputted; and
a flip-flop circuit for latching output data of said NAND circuit in synchronization with a clock signal outputted from said sampling clock signal generating circuit and outputting the latched data as ancillary data.

7. The data transmitting and receiving apparatus according to claim 1, wherein said main data receiving circuit and/or said ancillary data receiving circuit receives a differential signal as the serial data and/or the modulated clock signal.

8. A data transmitting apparatus comprising:
a main data transmitting circuit for converting main data into serial data and transmitting the serial data via at least one transmission path in synchronization with a clock signal; and
an ancillary data transmitting circuit for pulse-width-modulating the clock signal by using ancillary data to generate a modulated clock signal having at least three kinds of pulse widths in a predetermined order and transmitting the modulated clock signal via another transmission path, said ancillary data transmitting circuit including a one-bit signal generating circuit for generating a one-bit signal which is inverted at a cycle of the clock signal when the second value is inputted as the ancillary data and a pulse width generating and modulating circuit for generating a pulse having a pulse width of 50% of the cycle of the clock signal when the first value is inputted as the ancillary data and alternatively and selectively generating (i) a pulse having a pulse width of (50−a)% of the cycle of the clock signal when the second value is inputted as the ancillary data and the first value is inputted as the one-bit signal and (ii) a pulse having a pulse width of (50+a)% of the cycle of the clock signal when the second value is inputted as the ancillary data and the second value is inputted as the one-bit signal, where "a" satisfies 0<a<50.

9. The data transmitting and receiving apparatus according to claim 1, wherein value of "a" is 20 and value of "b" is 20.

10. A data receiving apparatus comprising:
a main data receiving circuit for receiving serial data and converting the received serial data into parallel data to obtain main data; and
an ancillary data receiving circuit fur receiving a pulse-width-modulated clock signal and demodulating the received clock signal to obtain ancillary data said ancillary data receiving circuit including a pulse width detecting circuit for receiving the pulse-width-modulated clock signal and detecting whether or not a pulse width of the received clock signal is within a range from (50−b)% to (50+b)% of one cycle on the basis of a rising edge of the received clock signal, where "b" satisfies 0<b<50, wherein the pulse-width-modulated clock signal has at least three kinds of pulse widths in a predetermined order, including a pulse having a pulse width of 50% of a cycle of the received clock signal, a pulse having a pulse width of (50−b)% of the cycle of the received clock signal and a pulse having a pulse width of (50+b)% of the cycle of the received clock signal plus the second-percentage value.

11. The data receiving apparatus according to claim 10, wherein
the ancillary output data becomes a first value, if the pulse has the pulse width of 50% of the cycle of the received clock signal;
the ancillary output data becomes a second value, if the pulse has the pulse width of (50−b)% of the cycle of the received clock signal; and
the ancillary output data becomes the second value, if the pulse has the pulse width of (50+b)% of the cycle of the received clock signal.

* * * * *